(12) United States Patent
Westman et al.

(10) Patent No.: US 11,834,065 B2
(45) Date of Patent: Dec. 5, 2023

(54) SYSTEM, METHOD, AND COMPUTER PROGRAM PRODUCT FOR DETECTING ROAD MARKING POINTS FROM LIDAR DATA

(71) Applicant: Argo AI, Pittsburgh, PA (US)

(72) Inventors: Eric Alexander Westman, Pittsburgh, PA (US); Xxx Xinjilefu, Pittsburgh, PA (US)

(73) Assignee: Argo AI, Pittsburgh, PA (US)

( * ) Notice: Subject to any disclaimer, the term of this patent is extended or adjusted under 35 U.S.C. 154(b) by 155 days.

(21) Appl. No.: 17/128,946

(22) Filed: Dec. 21, 2020

(65) Prior Publication Data

US 2022/0194413 A1 Jun. 23, 2022

(51) Int. Cl.
| | |
|---|---|
| *B60W 60/00* | (2020.01) |
| *G08G 1/137* | (2006.01) |
| *G01S 17/89* | (2020.01) |
| *G05D 1/00* | (2006.01) |
| *G01C 21/00* | (2006.01) |
| *G05D 1/02* | (2020.01) |

(52) U.S. Cl.
CPC ....... *B60W 60/001* (2020.02); *G01C 21/3815* (2020.08); *G01S 17/89* (2013.01); *G05D 1/0088* (2013.01); *G05D 1/0236* (2013.01); *G08G 1/137* (2013.01); *B60W 2420/52* (2013.01); *B60W 2552/53* (2020.02); *G05D 2201/0213* (2013.01)

(58) Field of Classification Search
CPC ........... B60W 60/001; B60W 2420/52; B60W 2552/53; G01C 21/3815; G01S 17/89; G05D 1/0088; G05D 1/0236; G05D 2201/0213; G08G 1/137
See application file for complete search history.

(56) References Cited

U.S. PATENT DOCUMENTS

| | | | |
|---|---|---|---|
| 8,699,755 | B2 | 4/2014 | Stroila et al. |
| 11,555,903 | B1 * | 1/2023 | Kroeger ................. G01S 17/89 |

(Continued)

FOREIGN PATENT DOCUMENTS

| | | |
|---|---|---|
| CN | 110673107 A | 1/2020 |
| WO | 2020154967 A1 | 8/2020 |

OTHER PUBLICATIONS

Jung et al., "Real-Time Road Lane Detection in Urban Areas Using LiDAR Data", Electronics, Oct. 26, 2018, pp. 1-14, vol. 7.

*Primary Examiner* — Donald J Wallace
(74) *Attorney, Agent, or Firm* — The Webb Law Firm (57) ABSTRACT

Systems, methods, and autonomous vehicles for detecting road marking points from LiDAR data may obtain a LiDAR dataset generated by a LiDAR system; process, for each laser emitter of the LiDAR system, a point cloud associated with that laser emitter by: determining, for each point in the point cloud, based on a gradient of intensity at that point, whether that point corresponds to a gradient edge point; and determining, based on intensities of points in an interior segment of points between at least one candidate pair of gradient edge points and intensities of points in exterior segments of points outside the at least one candidate pair of gradient edge points, whether that candidate pair of gradient edge points corresponds to a road marking edge; and aggregate, from the processing of the plurality of point clouds, candidate pairs of gradient edge points determined to correspond to road marking edges.

17 Claims, 8 Drawing Sheets

(56) References Cited

U.S. PATENT DOCUMENTS

| | | | |
|---|---|---|---|
| 2017/0316253 A1* | 11/2017 | Phillips | G06V 20/56 |
| 2018/0188742 A1 | 7/2018 | Wheeler | |
| 2019/0011927 A1* | 1/2019 | Mou | G06V 20/56 |
| 2019/0219697 A1* | 7/2019 | Castorena Martinez | G01S 17/86 |
| 2019/0266741 A1 | 8/2019 | Uehara | |
| 2020/0142067 A1 | 5/2020 | Wang et al. | |
| 2020/0191914 A1* | 6/2020 | Kunz | G01S 17/931 |
| 2021/0004610 A1* | 1/2021 | Huang | G01S 17/931 |
| 2021/0048530 A1* | 2/2021 | Che | G01S 7/4804 |
| 2021/0350147 A1 | 11/2021 | Yuan et al. | |
| 2022/0051094 A1* | 2/2022 | Chentanez | G06T 17/205 |
| 2022/0122363 A1* | 4/2022 | Liong | G01S 17/89 |
| 2022/0227373 A1* | 7/2022 | Harouche | G01C 21/1656 |

* cited by examiner

SYSTEM, METHOD, AND COMPUTER PROGRAM PRODUCT FOR DETECTING ROAD MARKING POINTS FROM LIDAR DATA

BACKGROUND

1. Field

This disclosure relates generally to object detection and, in some non-limiting embodiments or aspects, to detecting road marking points from LiDAR data.

2. Technical Considerations

High definition maps are used in many autonomous driving systems. For example, a 3D LiDAR map may provide a reference to which LiDAR scans may be registered online by a localization subsystem in order to localize the vehicle within the map to a high level of accuracy. Adding semantic information (e.g., labeling the points as a road, a sidewalk, a road marking, vegetation, a building, etc.) to the LiDAR points in the map and online sweeps may aid a registration algorithm and provide a more localized estimate of the vehicle within the map.

SUMMARY

Accordingly, provided are improved systems, methods, products, apparatuses, and/or devices for detecting road marking points from LiDAR data. The detected road marking points may be used to generate and/or update a map (e.g., a 3D LiDAR map, etc.) used to control an autonomous vehicle and/or to facilitate at least one autonomous driving operation of an autonomous vehicle, such as localizing the autonomous vehicle in a 3D LiDAR map of a geographic area in which the autonomous vehicle is located and/or the like.

According to some non-limiting embodiments or aspects, provided are a method and system that obtain a LiDAR dataset generated by a LiDAR system, the LiDAR dataset defining a plurality of point clouds associated with a plurality of laser emitters of the LiDAR system; process, for each laser emitter of the plurality of laser emitters, a point cloud of the plurality of point clouds associated with that laser emitter by: determining, for each point in the point cloud, based on a gradient of intensity at that point, whether that point corresponds to a gradient edge point; and determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge; aggregate, from the processing of the plurality of point clouds, candidate pairs of gradient edge points determined to correspond to road marking edges; and use the candidate pairs of gradient edge points determined to correspond to the road marking edges to at least one of generate a map including the road marking edges, facilitate at least one autonomous driving operation of an autonomous vehicle, or any combination thereof.

According to some non-limiting embodiments or aspects, provided is an autonomous vehicle that includes a LiDAR system configured to generate a LiDAR dataset, the LiDAR dataset defining a plurality of point clouds associated with a plurality of laser emitters of the LiDAR system; and a computing device programmed and/or configured to: obtain a LiDAR dataset generated by a LiDAR system, the LiDAR dataset defining a plurality of point clouds associated with a plurality of laser emitters of the LiDAR system; process, for each laser emitter of the plurality of laser emitters, a point cloud of the plurality of point clouds associated with that laser emitter by: determining, for each point in the point cloud, based on a gradient of intensity at that point, whether that point corresponds to a gradient edge point; and determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge; aggregate, from the processing of the plurality of point clouds, candidate pairs of gradient edge points determined to correspond to road marking edges; and localize, based on the candidate pairs of gradient edge points determined to correspond to the road marking edges, the autonomous vehicle in a 3D LiDAR map of a geographic area in which the autonomous vehicle is located.

Further embodiments or aspects are set forth in the following numbered clauses:

Clause 1. A computer implemented method comprising: obtaining a LiDAR dataset generated by a LiDAR system, the LiDAR dataset defining a plurality of point clouds associated with a plurality of laser emitters of the LiDAR system; processing, for each laser emitter of the plurality of laser emitters, a point cloud of the plurality of point clouds associated with that laser emitter by: determining, for each point in the point cloud, based on a gradient of intensity at that point, whether that point corresponds to a gradient edge point; and determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge; aggregating, from the processing of the plurality of point clouds, candidate pairs of gradient edge points determined to correspond to road marking edges; and using the candidate pairs of gradient edge points determined to correspond to the road marking edges to at least one of generate a map including the road marking edges, facilitate at least one autonomous driving operation of an autonomous vehicle, or any combination thereof.

Clause 2. The computer implemented method of clause 1, wherein processing, for each laser emitter of the plurality of laser emitters, the point cloud of the plurality of point clouds associated with that laser emitter further includes: sorting points of the point cloud based on at least one of azimuth angles associated with the points, times associated with the points, or any combination thereof.

Clause 3. The computer-implemented method of clauses 1 or 2, wherein determining, for each point in the point cloud, based on the gradient of intensity at that point, whether that point corresponds to a gradient edge point further includes: determining, based on the gradient of intensity at that point for a pair of neighboring points in the point cloud including that point and another point and a relative difference in intensity between the pair of neighboring points, whether that point corresponds to a gradient edge point.

Clause 4. The computer implemented method of any of clauses 1-3, wherein determining whether the at least one candidate pair of gradient edge points corresponds to a road marking edge is based on at least one of the following parameters: an angular arc of the interior segment of points, a Euclidean distance of the interior segment of points, a maximum distance between consecutive points in the interior segment of points, a minimum intensity of the points in the interior segment of points, a ratio of the minimum intensity of the points in the interior segment of points to a maximum intensity of the points in the interior segment of points, a difference between a mean interior intensity of the interior segment of points and a mean exterior intensity of the exterior segments of points, a standard deviation of the interior segment of points, or any combination thereof.

Clause 5. The computer implemented method of any of clauses 1-4, wherein point clouds of the plurality of point clouds associated with the plurality of laser emitters are processed separately and in parallel using multithreading.

Clause 6. The computer implemented method of any of clauses 1-5, wherein each LiDAR point cloud of the plurality of LiDAR point clouds corresponds to a single 360 degree sweep of the LiDAR system.

Clause 7. The computer implemented method of any of clauses 1-6, further comprising: localizing, based on the candidate pairs of gradient edge points determined to correspond to the road marking edges, the autonomous vehicle in a 3D LiDAR map of a geographic area in which the autonomous vehicle is located.

Clause 8. A system comprising: one or more processors programmed and/or configured to: obtain a LiDAR dataset generated by a LiDAR system, the LiDAR dataset defining a plurality of point clouds associated with a plurality of laser emitters of the LiDAR system; process, for each laser emitter of the plurality of laser emitters, a point cloud of the plurality of point clouds associated with that laser emitter by: determining, for each point in the point cloud, based on a gradient of intensity at that point, whether that point corresponds to a gradient edge point; and determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge; aggregate, from the processing of the plurality of point clouds, candidate pairs of gradient edge points determined to correspond to road marking edges; and use the candidate pairs of gradient edge points determined to correspond to the road marking edges to at least one of generate a map including the road marking edges, facilitate at least one autonomous driving operation of an autonomous vehicle, or any combination thereof.

Clause 9. The system of clause 8, wherein the one or more processors are further programmed and/or configured to process, for each laser emitter of the plurality of laser emitters, the point cloud of the plurality of point clouds associated with that laser emitter by: sorting points of the point cloud based on at least one of azimuth angles associated with the points, times associated with the points, or any combination thereof.

Clause 10. The system of clauses 8 or 9, wherein determining, for each point in the point cloud, based on the gradient of intensity at that point, whether that point corresponds to a gradient edge point further includes: determining, based on the gradient of intensity at that point for a pair of neighboring points in the point cloud including that point and another point and a relative difference in intensity between the pair of neighboring points, whether that point corresponds to a gradient edge point.

Clause 11. The system of any of clauses 8-10, wherein determining whether the at least one candidate pair of gradient edge points corresponds to a road marking edge is based on at least one of the following parameters: an angular arc of the interior segment of points, a Euclidean distance of the interior segment of points, a maximum distance between consecutive points in the interior segment of points, a minimum intensity of the points in the interior segment of points, a ratio of the minimum intensity of the points in the interior segment of points to a maximum intensity of the points in the interior segment of points, a difference between a mean interior intensity of the interior segment of points and a mean exterior intensity of the exterior segments of points, a standard deviation of the interior segment of points, or any combination thereof.

Clause 12. The system of any of clauses 8-11, wherein the one or more processors are further programmed and/or configured to process point clouds of the plurality of point clouds associated with the plurality of laser emitters separately and in parallel using multithreading.

Clause 13. The system of any of clauses 8-12, wherein each LiDAR point cloud of the plurality of LiDAR point clouds corresponds to a single 360 degree sweep of the LiDAR system.

Clause 14. The system of any of clauses 8-13, wherein the one or more processors are further programmed and/or configured to: localize, based on the candidate pairs of gradient edge points determined to correspond to the road marking edges, the autonomous vehicle in a 3D LiDAR map of a geographic area in which the autonomous vehicle is located.

Clause 15. An autonomous vehicle comprising: a LiDAR system configured to generate a LiDAR dataset, the LiDAR dataset defining a plurality of point clouds associated with a plurality of laser emitters of the LiDAR system; and a computing device programmed and/or configured to: obtain a LiDAR dataset generated by a LiDAR system, the LiDAR dataset defining a plurality of point clouds associated with a plurality of laser emitters of the LiDAR system; process, for each laser emitter of the plurality of laser emitters, a point cloud of the plurality of point clouds associated with that laser emitter by: determining, for each point in the point cloud, based on a gradient of intensity at that point, whether that point corresponds to a gradient edge point; and determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge; aggregate, from the processing of the plurality of point clouds, candidate pairs of gradient edge points determined to correspond to road marking edges; and localize, based on the candidate pairs of gradient edge points determined to correspond to the road marking edges, the autonomous vehicle in a 3D LiDAR map of a geographic area in which the autonomous vehicle is located.

Clause 16. The autonomous vehicle of clause 15, wherein the computing device is further programmed and/or configured to process, for each laser emitter of the plurality of laser emitters, the point cloud of the plurality of point clouds associated with that laser emitter by: sorting points of the point cloud based on at least one of azimuth angles associated with the points, times associated with the points, or any combination thereof.

Clause 17. The autonomous vehicle of clauses 15 or 16, wherein determining, for each point in the point cloud, based on the gradient of intensity at that point, whether that point corresponds to a gradient edge point further includes: determining, based on the gradient of intensity at that point for a pair of neighboring points in the point cloud including that point and another point and a relative difference in intensity between the pair of neighboring points, whether that point corresponds to a gradient edge point.

Clause 18. The autonomous vehicle of any of clauses 15-17, wherein determining whether the at least one candidate pair of gradient edge points corresponds to a road marking edge is based on at least one of the following parameters: an angular arc of the interior segment of points, a Euclidean distance of the interior segment of points, a maximum distance between consecutive points in the interior segment of points, a minimum intensity of the points in the interior segment of points, a ratio of the minimum intensity of the points in the interior segment of points to a maximum intensity of the points in the interior segment of points, a difference between a mean interior intensity of the interior segment of points and a mean exterior intensity of the exterior segments of points, a standard deviation of the interior segment of points, or any combination thereof.

Clause 19. The autonomous vehicle of any of clauses 15-18, wherein the one or more processors are further programmed and/or configured to process point clouds of the plurality of point clouds associated with the plurality of laser emitters separately and in parallel using multithreading.

Clause 20. The autonomous vehicle of any of clauses 15-19, wherein each LiDAR point cloud of the plurality of LiDAR point clouds corresponds to a single 360 degree sweep of the LiDAR system.

BRIEF DESCRIPTION OF THE DRAWINGS

Additional advantages and details are explained in greater detail below with reference to the exemplary embodiments that are illustrated in the accompanying schematic figures, in which.

DESCRIPTION

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a generated display, such as one or more graphical user interfaces (GUIs) with which a user may interact, either directly or indirectly (e.g., through a keyboard, mouse, touchscreen, etc.).

Existing semantic segmentation algorithms rely on computationally expensive neural networks to process camera images in order to extract semantic labels from LiDAR data. A faster semantic point labeler that uses only LiDAR data may be preferable to computationally expensive neural network solutions on a mobile platform such as an autonomous vehicle.

Although all semantic classes may not be identified from LiDAR data alone, painted road markings may have several properties that can help distinguish them from other elements in LiDAR data. For example, LiDAR returns from road markings may tend to have higher measured intensity than LiDAR returns from non-painted road surfaces such as asphalt or concrete. LiDAR returns may further occur in relatively predictable areas of a LiDAR scan (e.g., on the ground plane near the vehicle, etc.), which makes road markings a good or better feature to identify from LiDAR scans. Existing techniques for detecting road markings from LiDAR point clouds often rely on obtaining calibrated intensity values for measured points. However, intensity values alone may not be sufficient to distinguish road marking points, because there may exist many other high intensity points detected on other surfaces such as buildings, curbs, vehicles, and/or the like.

Non-limiting embodiments or aspects of the present disclosure provide for systems, methods, and autonomous vehicles that obtain a LiDAR dataset generated by a LiDAR system, the LiDAR dataset defining a plurality of point clouds associated with a plurality of laser emitters of the LiDAR system; process, for each laser emitter of the plurality of laser emitters, a point cloud of the plurality of point clouds associated with that laser emitter by: determining, for each point in the point cloud, based on a gradient of intensity at that point, whether that point corresponds to a gradient edge point; and determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge; aggregate, from the processing of the plurality of point clouds, candidate pairs of gradient edge points determined to correspond to road marking edges; and use the candidate pairs of gradient edge points determined to correspond to the road marking edges to at least one of generate a map including the road marking edges, facilitate at least one autonomous driving operation of an autonomous vehicle, or any combination thereof.

In this way, non-limiting embodiments or aspects of the present disclosure provide for using LiDAR point clouds with uncalibrated intensity to identify and/or determine which points in a LiDAR sweep correspond to painted road markings (e.g., lane dividers, turn arrows, crosswalks, bike lanes, etc.) on a road surface. Accordingly, non-limiting embodiments or aspects of the present disclosure may be adaptable to a variety of different sensors and environments, without requiring extensive training and/or tuning or calibration for a particular vehicle or sensor, and without relying on computationally expensive neural networks to process camera images in order to extract semantic labels from LiDAR data.

Figure 1:
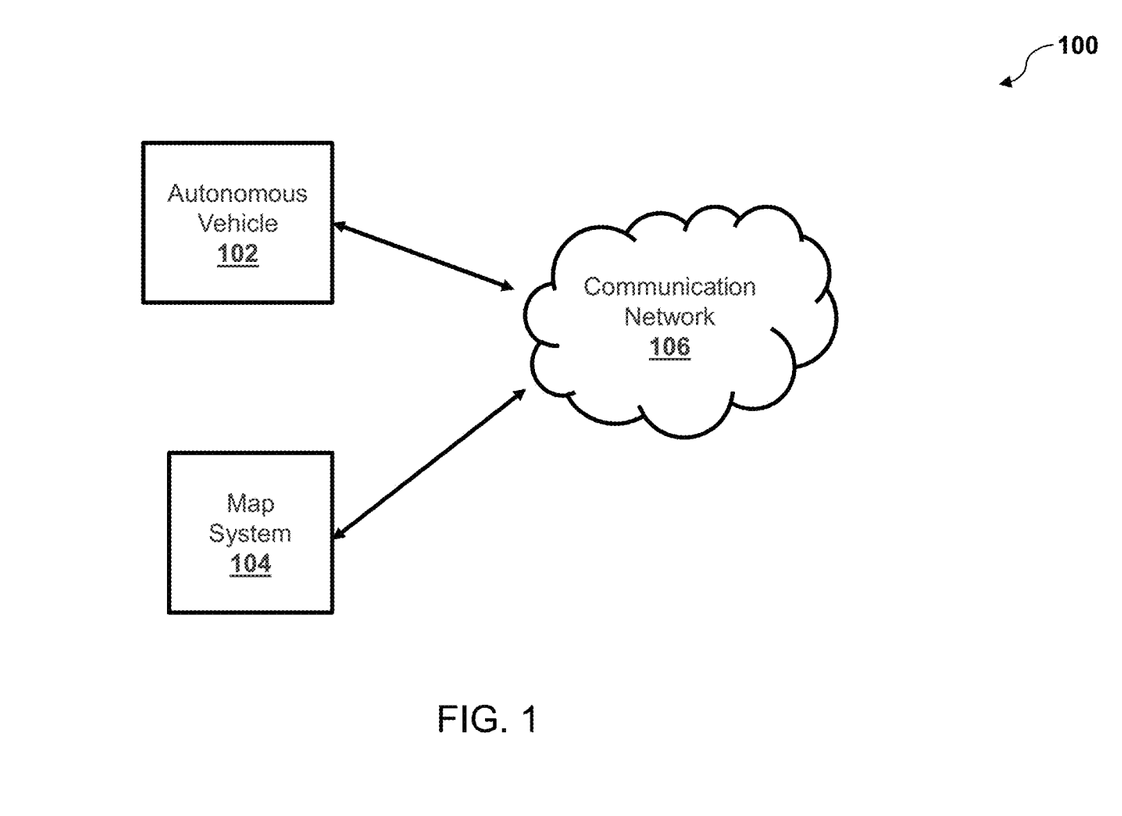
FIG. 1 is a diagram of non-limiting embodiments or aspects of an environment in which systems, methods, products, apparatuses, and/or devices, described herein, may be implemented.

Referring now to FIG. 1, FIG. 1 is a diagram of an example environment 100 in which systems, methods, products, apparatuses, and/or devices described herein, may be implemented. As shown in FIG. 1, environment 100 may include autonomous vehicle 102, map system 104, and/or communication network 106.

Autonomous vehicle 102 may include one or more devices capable of receiving information and/or data from map system 104 via communication network 106 and/or communicating information and/or data to map system 104 via communication network 106. For example, autonomous vehicle 102 may include a computing device, such as a server, a group of servers, and/or other like devices.

Map system 104 may include one or more devices capable of receiving information and/or data from autonomous vehicle 102 via communication network 106 and/or communicating information and/or data to autonomous vehicle 102 via communication network 106. For example, map system 104 may include a computing device, such as a server, a group of servers, and/or other like devices.

Communication network 106 may include one or more wired and/or wireless networks. For example, communication network 106 may include a cellular network (e.g., a long-term evolution (LTE) network, a third generation (3G) network, a fourth generation (4G) network, a fifth generation (5G) network a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 102 may incorporate the functionality of map system 104 such that autonomous vehicle 102 can operate without communication to or from map system 104. Additionally, or alternatively, a set of devices and/or systems (e.g., one or more devices or systems) of environment 100 may perform one or more functions described as being performed by another set of devices and/or systems of environment 100.

Figure 2:
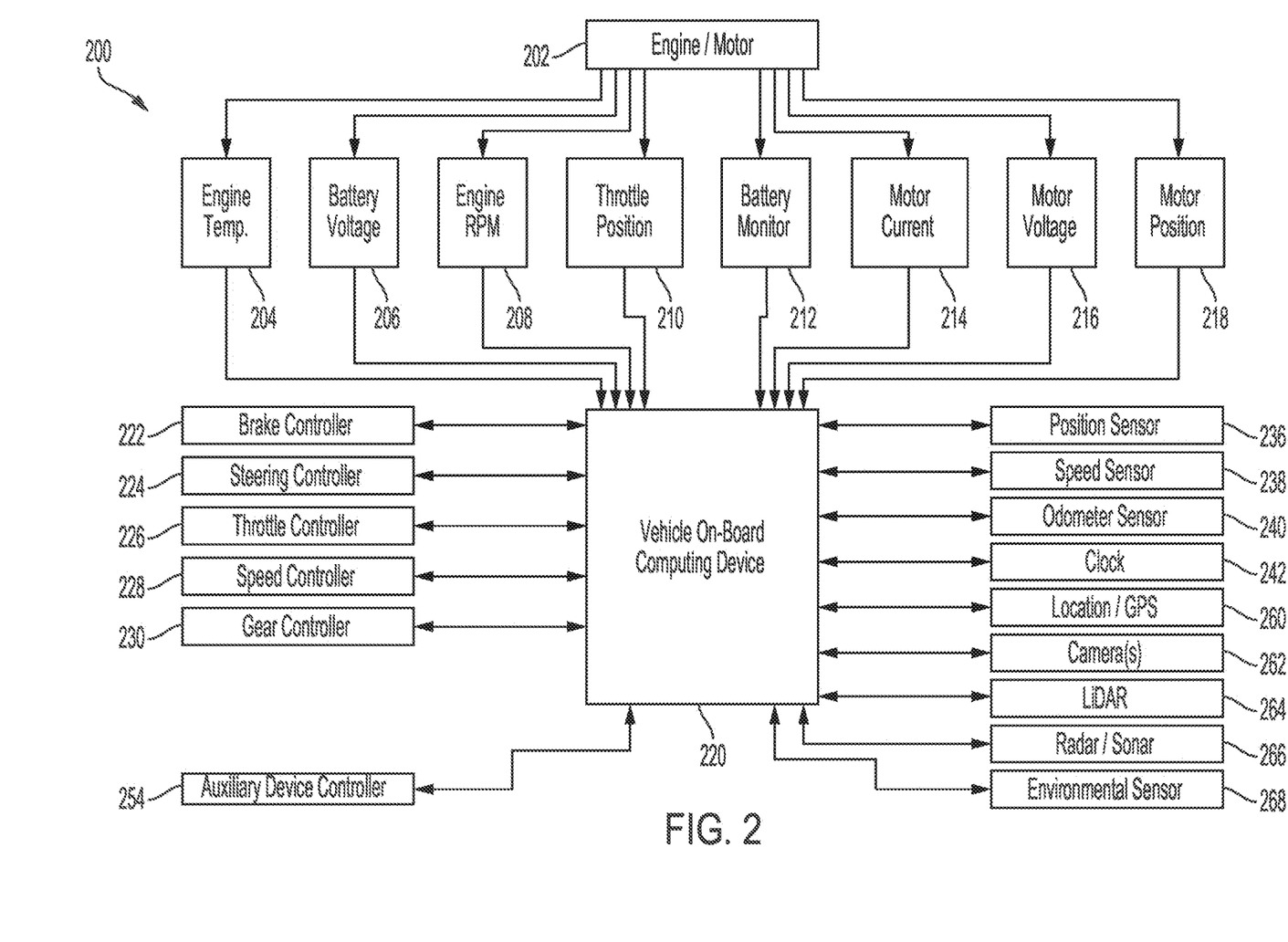
FIG. 2 is an illustration of an illustrative architecture for a vehicle.

Referring now to FIG. 2, FIG. 2 is an illustration of an illustrative system architecture 200 for a vehicle. Autonomous vehicle 102 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine Rotations Per Minute ("RPM") sensor 208, and/or throttle position sensor 210. In an electric or hybrid vehicle, the vehicle may have an electric motor, and may have sensors such as battery monitoring sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236 such as an accelerometer, gyroscope and/or inertial measurement unit; speed sensor 238; and/or odometer sensor 240. System architecture 200 may include clock 242 that the system 200 uses to determine vehicle time during operation. Clock 242 may be encoded into the vehicle on-board computing device 220, it may be a separate device, or multiple clocks may be available.

System architecture 200 may include various sensors that operate to gather information about an environment in which the vehicle is operating and/or traveling. These sensors may include, for example: location sensor 260 (e.g., a Global Positioning System ("GPS") device); object detection sensors such as one or more cameras 262; LiDAR sensor system 264; and/or radar and/or sonar system 266. The sensors may include environmental sensors 268 such as a precipitation sensor and/or ambient temperature sensor. The object detection sensors may enable the system architecture 200 to detect objects that are within a given distance range of the vehicle in any direction, and the environmental sensors 268 may collect data about environmental conditions within an area of operation and/or travel of the vehicle.

During operation of system architecture 200, information is communicated from the sensors of system architecture 200 to on-board computing device 220. On-board computing device 220 analyzes the data captured by the sensors and optionally controls operations of the vehicle based on results of the analysis. For example, on-board computing device 220 may control: braking via a brake controller 222; direction via steering controller 224; speed and acceleration via throttle controller 226 (e.g., in a gas-powered vehicle) or motor speed controller 228 such as a current level controller (e.g., in an electric vehicle); differential gear controller 230 (e.g., in vehicles with transmissions); and/or other controllers such as auxiliary device controller 254.

Geographic location information may be communicated from location sensor 260 to on-board computing device 220, which may access a map of the environment that corresponds to the location information to determine known fixed features of the environment such as streets, buildings, stop signs and/or stop/go signals. Captured images from cameras 262 and/or object detection information captured from sensors such as LiDAR 264 is communicated from those sensors to on-board computing device 220. The object detection information and/or captured images are processed by on-board computing device 220 to detect objects in proximity to the vehicle. Any known or to be known technique for making an object detection based on sensor data and/or captured images can be used in the embodiments disclosed in this document.

Figure 3:
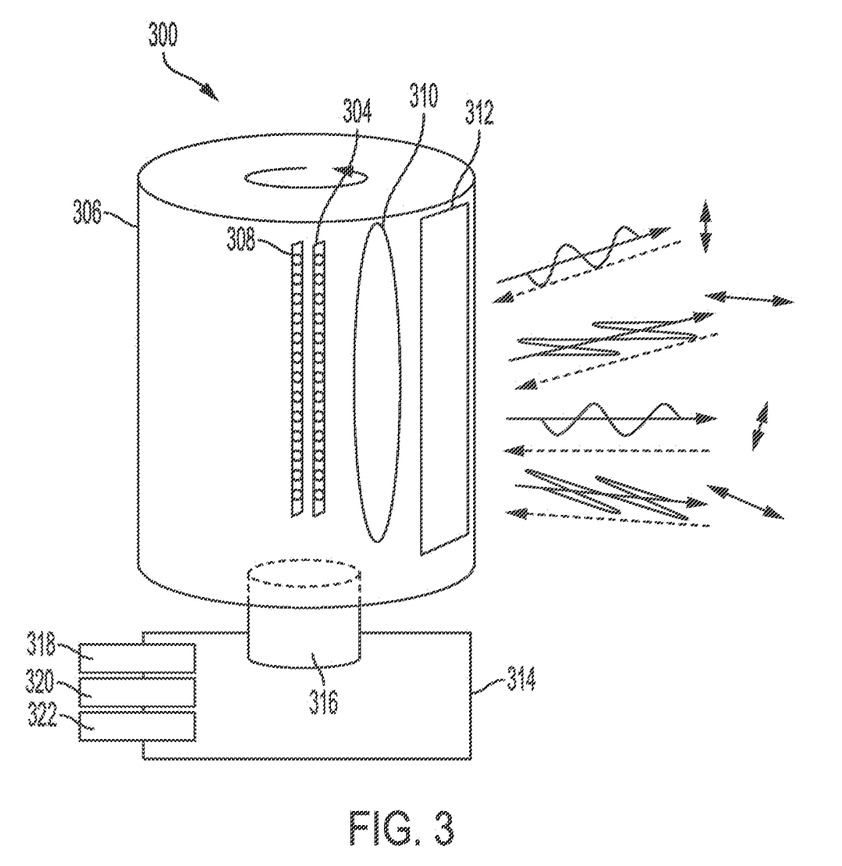
FIG. 3 is an illustration of an illustrative architecture for a LiDAR system.

Referring now to FIG. 3, FIG. 3 is an illustration of an illustrative LiDAR system 300. LiDAR system 264 of FIG. 2 may be the same as or substantially similar to LiDAR system 300.

As shown in FIG. 3, LiDAR system 300 may include housing 306, which may be rotatable 360° about a central axis such as hub or axle 316. Housing 306 may include an emitter/receiver aperture 312 made of a material transparent to light. Although a single aperture is shown in FIG. 2, non-limiting embodiments or aspects of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Emitter system 304 and light detector 308 may rotate with the rotating shell, or emitter system 304 and light detector 308 may rotate inside the stationary dome of housing 306. One or more optical element structures 310 may be positioned in front of light emitting unit 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments or aspects, multiple optical element structures 310 may be arranged in an array on or integral with the shell portion of housing 306.

In some non-limiting embodiments or aspects, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power the light emitting unit 304, motor 316, and electronic components. LiDAR system 300 may include an analyzer 314 with elements such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with the LiDAR system 300 as shown, or some or all of analyzer 314 may be external to LiDAR system 300 and communicatively connected to LiDAR system 300 via a wired and/or wireless communication network or link.

Figure 4:
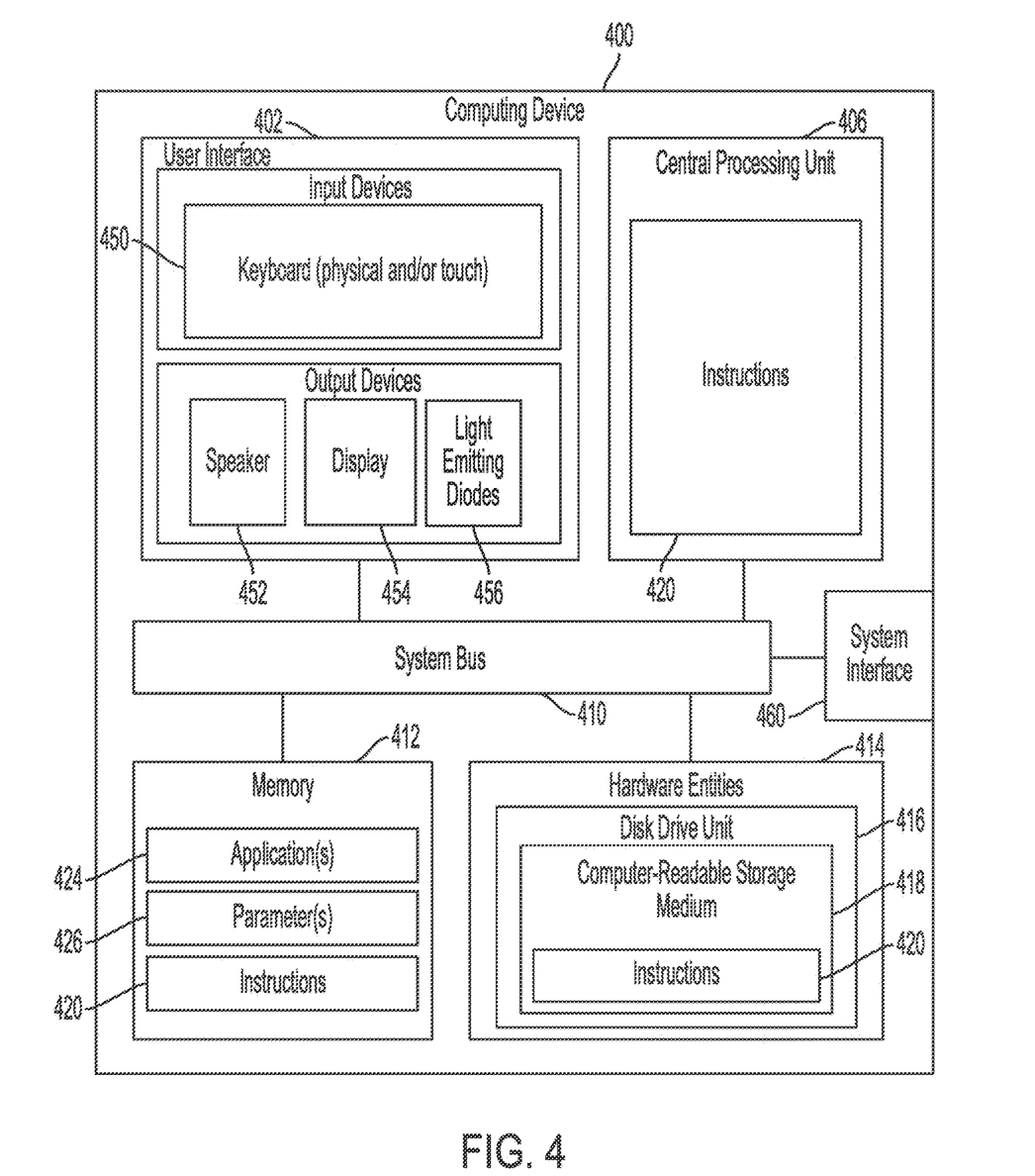
FIG. 4 is an illustration of an illustrative computing device.

Referring now to FIG. 4, FIG. 4 is an illustration of an illustrative architecture for a computing device 400. Computing device 400 can correspond to one or more devices of (e.g., one or more devices of a system of) autonomous vehicle 102 (e.g., one more devices of systems architecture 200, etc.) and/or one or more devices of map system 104. In some non-limiting embodiments or aspects, one or more devices of (e.g., one or more devices of a system of) autonomous vehicle 102 (e.g., one or more devices of system architecture 200, etc.) and/or one or more devices of map system 104 can include at least one computing device 400 and/or at least one component of computing device 400.

The number and arrangement of components shown in FIG. 4 are provided as an example. In some non-limiting embodiments or aspects, computing device 400 may include additional components, fewer components, different components, or differently arranged components than those shown in FIG. 4. Additionally, or alternatively, a set of components (e.g., one or more components) of computing device 400 may perform one or more functions described as being performed by another set of components of device 400.

As shown in FIG. 4, computing device 400 comprises user interface 402, Central Processing Unit ("CPU") 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of the computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes such as access points, etc.).

At least some of hardware entities 414 may perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, applications 424, and/or parameters 426 can also reside, completely or at least partially, within memory 412 and/or within CPU 406 during execution and/or use thereof by computing device 400. Memory 412 and CPU 406 may include machine-readable media. The term "machine-readable media", as used here, may refer to a single medium or multiple media (e.g., a centralized or distributed database, and/or associated caches and server) that store the one or more sets of instructions 420. The term "machine readable media", as used here, may refer to any medium that is capable of storing, encoding or carrying a set of instructions 420 for execution by computing device 400 and that cause computing device 400 to perform any one or more of the methodologies of the present disclosure.

Figure 5:
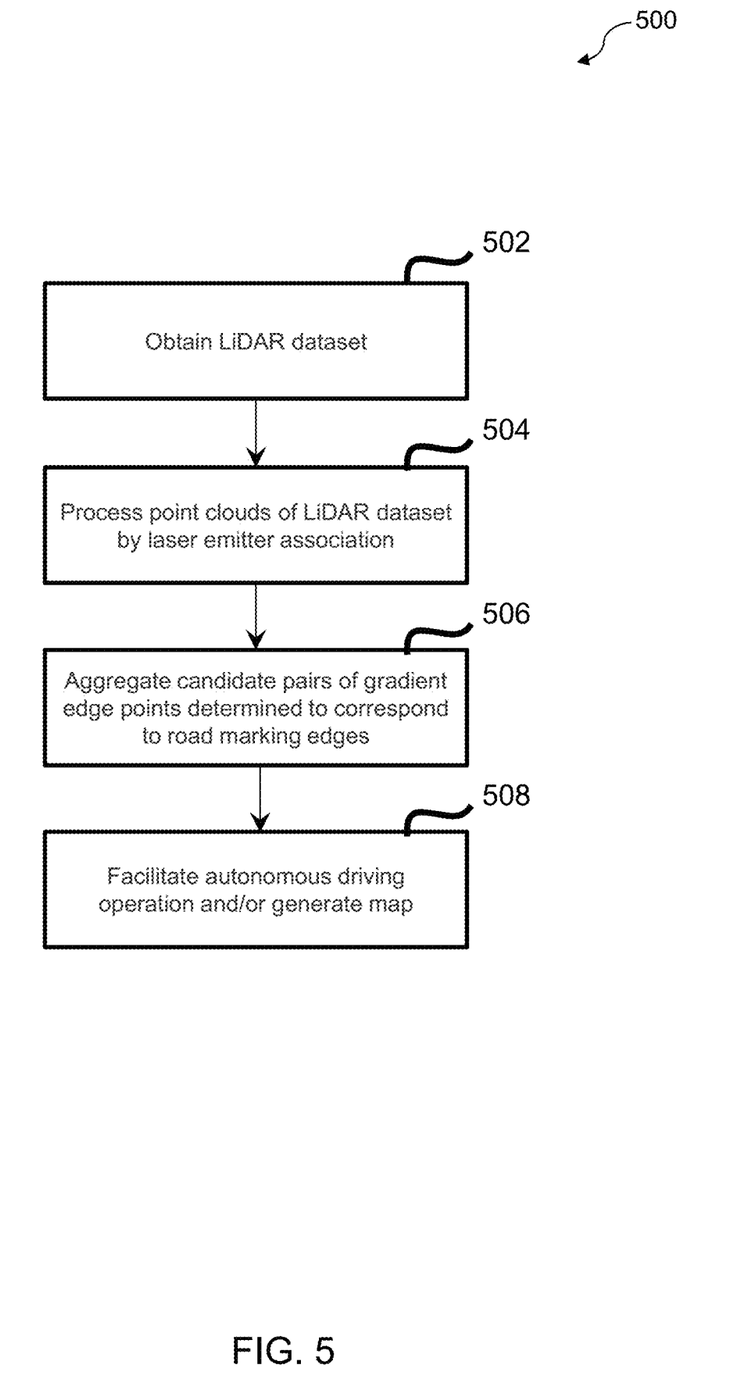
FIG. 5 is a flowchart of non-limiting embodiments or aspects of a process for detecting road marking points from LiDAR data.

Referring now to FIG. 5, FIG. 5 is a flowchart of non-limiting embodiments or aspects of a process 500 for detecting road marking points from LiDAR data. In some non-limiting embodiments or aspects, one or more of the steps of process 500 may be performed (e.g., completely, partially, etc.) by map system 104 (e.g., one or more devices of map system 104, etc.). In some non-limiting embodiments or aspects, one or more of the steps of process 500 may be performed (e.g., completely, partially, etc.) by another device or a group of devices separate from or including map system 104, such as autonomous vehicle 102 (e.g., system architecture 200, etc.).

As shown in FIG. 5, at step 502, process 500 includes obtaining a LiDAR dataset. For example, autonomous vehicle 102 and/or map system 104 may obtain a LiDAR dataset generated by a LiDAR system (e.g., LiDAR system 300, etc.). The LiDAR dataset may define a plurality of point clouds associated with a plurality of laser emitters of the LiDAR system. For example, each point cloud may be associated with a single laser emitter. The LiDAR dataset may define, for each point in a point cloud, Euclidean X, Y, and Z values relative to a common sensor frame, a measured intensity (e.g., on a scale from 0-255, etc.), a time associated with the measured intensity, and/or a laser emitter number or index of the laser emitter used to obtain the measured intensity.

In some non-limiting embodiments or aspects, each LiDAR point cloud of the plurality of LiDAR point clouds corresponds to a single 360 degree sweep of LiDAR system 300. For example, the LiDAR dataset may include a single accumulated LiDAR sweep, and the sweep may be motion-compensated and provide a full 360 degree coverage of a scene surrounding LiDAR system 300.

In some non-limiting embodiments or aspects, measured intensities of the plurality of LiDAR point clouds are uncalibrated intensities. For example, measured intensity values measured at a same point by different LiDAR systems and/or different laser emitters/receivers may vary across the different LiDAR systems and/or different laser emitters/receivers without calibration.

As shown in FIG. 5, at step 504, process 500 includes processing point clouds of a LiDAR dataset by laser emitter association. For example, autonomous vehicle 102 and/or map system 104 may process, for each laser emitter of the plurality of laser emitters, a point cloud of the plurality of point clouds associated with that laser emitter. As an example, the points defined by the LiDAR dataset (e.g., the points in a single 360 degree LiDAR sweep, etc.) may be separated into disjoint sets based on the laser emitter of origin.

In some non-limiting embodiments or aspects, point clouds of the plurality of point clouds associated with the plurality of laser emitters are processed separately and in parallel using multithreading and/or multiprocessing. For example, the points associated with each laser emitter may be processed separately and in parallel by use of multithreading.

Further details regarding non-limiting embodiments or aspects of step 504 of process 500 are provided below with regard to FIG. 6, which is a flowchart of non-limiting embodiments or aspects of a process 600 for detecting road marking points from LiDAR data. In some non-limiting embodiments or aspects, one or more of the steps of process 600 may be performed (e.g., completely, partially, etc.) by map system 104 (e.g., one or more devices of map system 104, etc.). In some non-limiting embodiments or aspects, one or more of the steps of process 600 may be performed (e.g., completely, partially, etc.) by another device or a group of devices separate from or including map system 104, such as autonomous vehicle 102 (e.g., system architecture 200, etc.).

Figure 6:
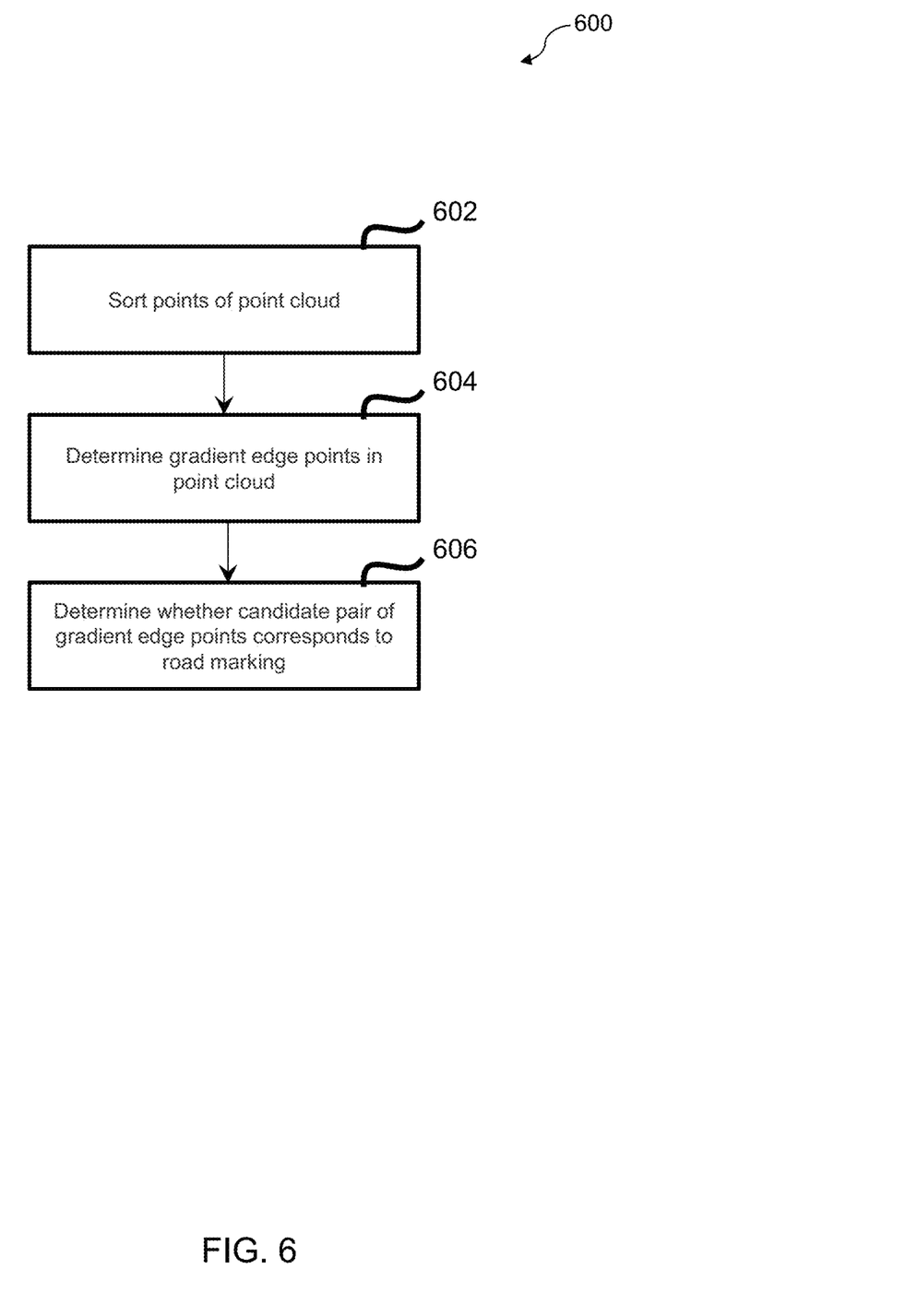
FIG. 6 is a flowchart of non-limiting embodiments or aspects of a process for detecting road marking points from LiDAR data.

As shown in FIG. 6, at step 602, process 600 includes sorting points of a point cloud. For example, to process, for each laser emitter of the plurality of laser emitters, a point cloud of the plurality of point clouds associated with that laser emitter, autonomous vehicle 102 and/or map system 104 may sort points of the point cloud based on at least one of azimuth angles associated with the points, times associated with the points, or any combination thereof. As an example, the points of the point cloud may be presorted into an array and ordered according to the azimuth angle at which the intensity is measured or the time at which the intensity is measured in order to obtain a coherent spatial signal for the measured intensity. In such an example, neighboring points in the array are also neighboring measurements in the physical world.

Figure 7:
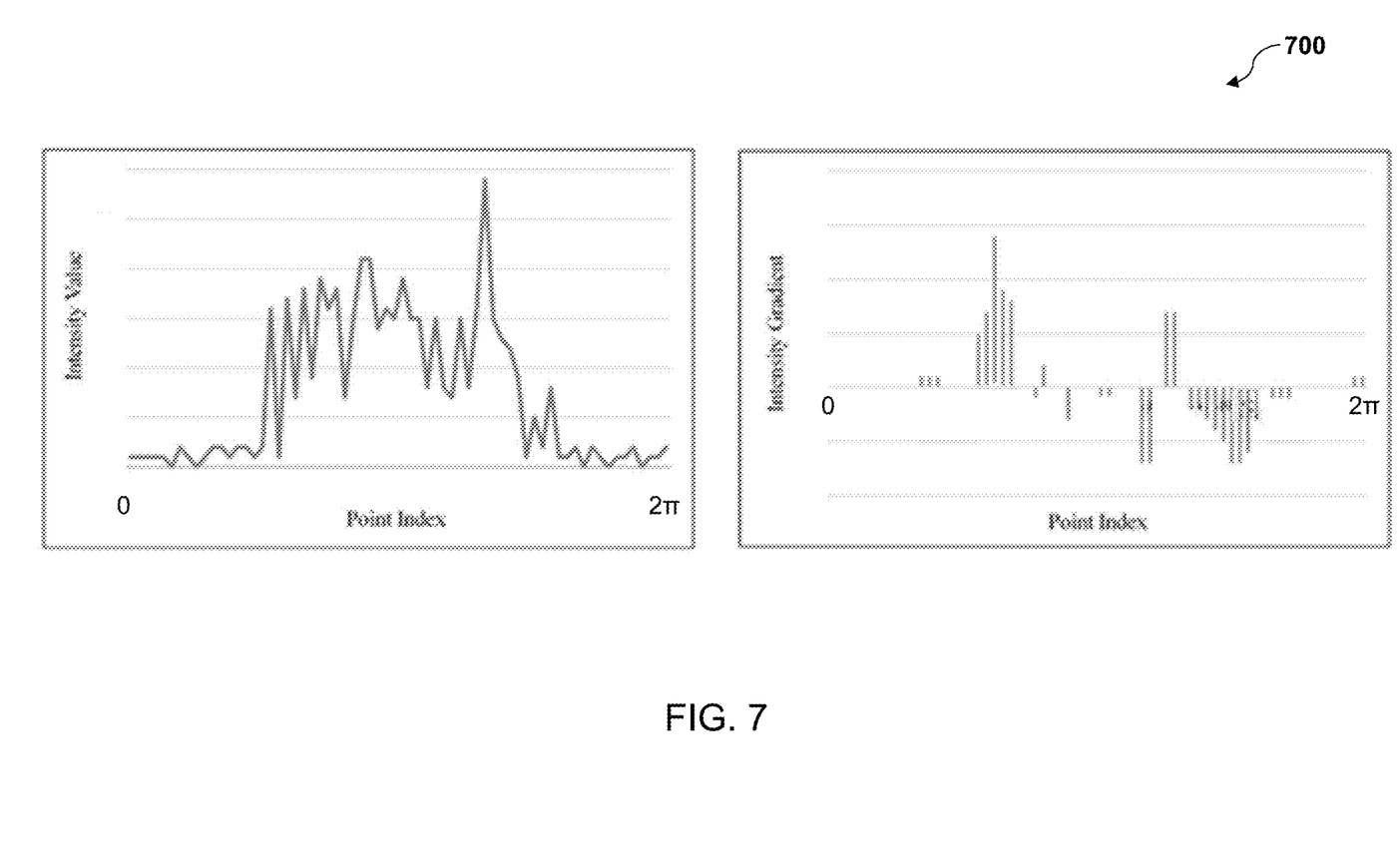
FIG. 7 shows a graph of an example point cloud intensity signal with respect to a graph of an example intensity gradient of the signal.

As shown in FIG. 6, at step 604, process 600 includes determining gradient edge points in a point cloud. For example, autonomous vehicle 102 and/or map system 104 may determine, for each point in the point cloud, based on a gradient of intensity at that point, whether that point corresponds to a gradient edge point. As an example, autonomous vehicle 102 and/or map system 104 may determine, for each point in the point cloud, based on a gradient of intensity at that point for a pair of neighboring points in the point cloud including that point and another point and a relative difference in intensity between the pair of neighboring points, whether that point corresponds to a gradient edge point. As an example, autonomous vehicle 102 and/or map system 104 may determine that a point of a pair of neighboring points in the point cloud corresponds to a gradient edge point if an absolute value of a gradient of intensity of the point of the pair of neighboring points (e.g., an absolute value of a difference in intensity between the neighboring points divided by a distance between the points, etc.) satisfies a first threshold (e.g., the gradient of intensity is above an intensity gradient threshold, etc.) and a relative difference in intensity between the neighboring points satisfies a second threshold (e.g., the relative difference in intensity is above a relative intensity threshold, etc.). For example, and as shown in FIG. 7, a single 360 degree sweep of LiDAR system 300 may produce a point cloud for a single laser emitter of LiDAR system 300 over a point index from 0 to 27, and an intensity gradient at each of the points in the point cloud may be determined as a difference in intensity between the point and a neighboring point divided by a distance between the points. From the difference in intensity of neighboring points, it can be determined whether one of the neighboring points corresponds to a gradient edge.

As shown in FIG. 6, at step 606, process 600 includes determining whether a candidate pair of gradient edge points corresponds to a road marking. For example, autonomous vehicle 102 and/or map system 104 may determine, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge. As an example, determining whether the at least one candidate pair of gradient edge points corresponds to a road marking edge may be based on at least one of the following parameters: an angular arc of the interior segment of points, a Euclidean distance of the interior segment of points, a maximum distance between consecutive points in the interior segment of points (e.g., a maximum raw X, Y, and Z distance, a maximum Z gradient distance, etc.), a minimum intensity of the points in the interior segment of points, a ratio of the minimum intensity of the points in the interior segment of points to a maximum intensity of the points in the interior segment of points, a difference between a mean interior intensity of the interior segment of points and a mean exterior intensity of the exterior segments of points, a standard deviation of the interior segment of points, or any combination thereof. In such an example, an exhaustive search between positive and negative gradient edge point pairs may be performed to identify candidate pairs of gradient edge points for determining road markings.

In some non-limiting embodiments or aspects, autonomous vehicle 102 and/or map system 104 may determine that the at least one candidate pair of gradient edge points corresponds to a road marking edge if an angular arc of the interior segment of points satisfies a first threshold (e.g., the angular arc of the interior segment of points is less than an angular arc threshold, etc.), a Euclidean distance of the interior segment of points satisfies a second threshold (e.g., the Euclidean distance of the interior segment of points is less than a Euclidean distance threshold, etc.), a maximum distance between consecutive points in the interior segment of points satisfies a third threshold (e.g., the maximum distance between consecutive points in the interior segment of points is less than a maximum distance threshold, etc.), a minimum intensity of the points in the interior segment of points satisfies a fourth threshold (e.g., the minimum intensity of the points in the interior segment of points is greater than a minimum intensity threshold, etc.), a ratio of the minimum intensity of the points in the interior segment of points to a maximum intensity of the points in the interior segment of points satisfies a fifth threshold (e.g., the interior/exterior ratio is greater than an interior/exterior ratio threshold, etc.), a difference between a mean interior intensity of the interior segment of points and a mean exterior intensity of the exterior segments of points satisfies a sixth threshold (e.g., the interior/exterior mean difference is greater than an interior/exterior mean difference threshold, etc.), and a standard deviation of the interior segment of points satisfies a seventh threshold (e.g., the standard deviation of the interior segment of points is less than a standard deviation threshold, etc.).

In some non-limiting embodiments or aspects, a number of points in an exterior segment of points outside a candidate pair of gradient edge points may be determined or scaled based on a number of points in an interior segment of points between the candidate pair of gradient edge points. For example, a minimum number of points in the exterior segment of points may be set at two points and be scaled up as the number of points in the interior segment of points increases.

In some non-limiting embodiments or aspects, candidate pairs of edge points may be selected by moving from a beginning of the presorted array of points and selecting a first positive gradient edge point identified in the array as a first candidate point of the pair of candidate points and moving from an end of the presorted array of points and selecting a first negative gradient edge point identified in the array as a second candidate point of the pair of candidate points. If a pair of candidate points is determined to not correspond to a road marking edge, a next negative gradient edge point is identified as the second candidate end point by continuing to move in the array from the end of the array. If a pair of candidate points is determined to correspond to a road marking edge, the points between those points may be ignored, and a next positive gradient edge point is identified as a first candidate point of a next pair of candidate points by continuing to move in the array from the beginning of the array.

Referring again to FIG. 5, at step 506, process 500 includes aggregating candidate pairs of gradient edge points determined to correspond to road marking edges. For example, autonomous vehicle 102 and/or map system 104 may aggregate, from the processing of the plurality of point clouds (e.g., from the output of step 606 performed for each laser emitter, etc.), candidate pairs of gradient edge points determined to correspond to road marking edges.

As shown in FIG. 5, at step 508, process 500 includes at least one of facilitating an autonomous driving operation and generating a map. For example, autonomous vehicle 102 and/or map system 104 may use the candidate pairs of gradient edge points determined to correspond to the road marking edges to at least one of generate and/or update a map including the road marking edges, facilitate at least one autonomous driving operation of an autonomous vehicle, or any combination thereof.

Figure 8:
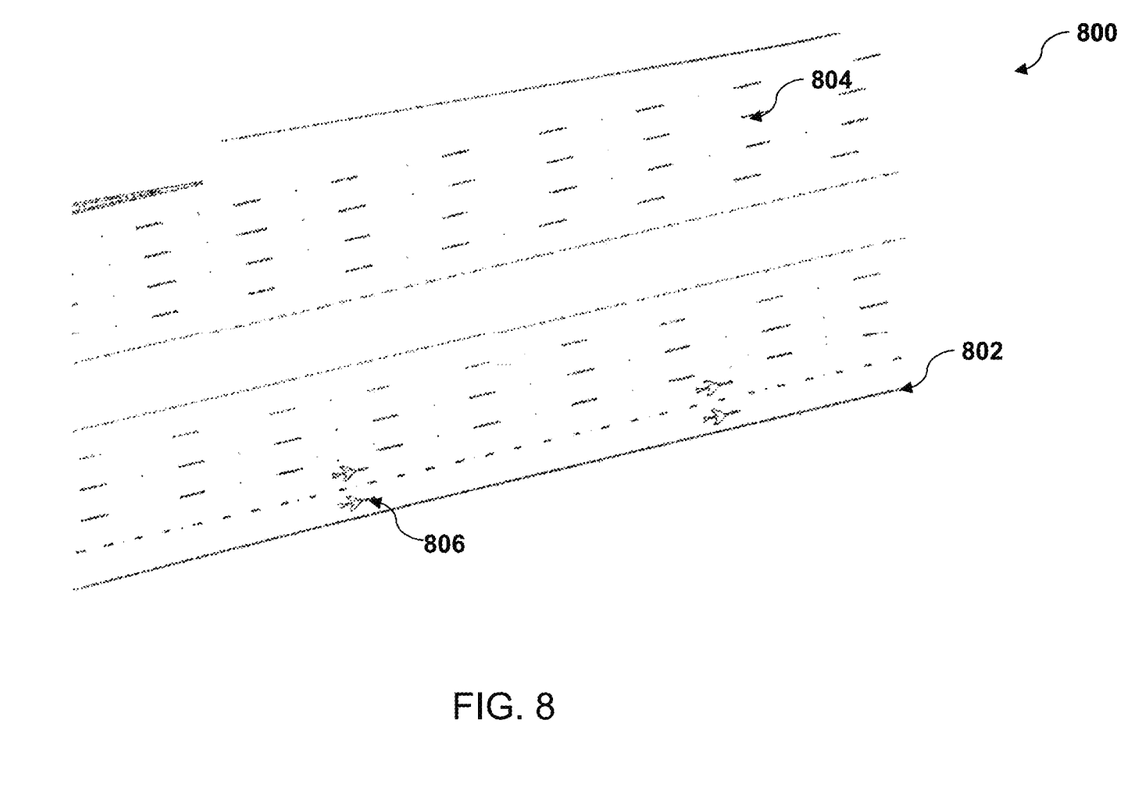
FIG. 8 is an example map including road marking points generated from LiDAR data.

FIG. 8 is an example map 800 including road marking edges generated from LiDAR data. For example, autonomous vehicle 102 and/or map system 104 may generate a new map and/or update an existing map based on the candidate pairs of gradient edge points determined to correspond to the road marking edges. Map 800, whether it be a new map or an update of an existing map, may be displayed on a GUI, such as a GUI populated on display 454 of autonomous vehicle 102. The map may include, among other features, road markings where at least the road marking edges are generated and/or determined through process 500. With reference to FIG. 8, these road markings can include solid lines defining edges of lanes 802, dashed lines 804 dividing lanes, specialized road markings 806 indicating a special purpose for certain lanes, in this case specialized road markings 806 in the shape of an airplane to indicate lanes leading to an airport, among others.

In some non-limiting embodiments or aspects, autonomous vehicle 102 and/or map system 104 may localize, based on the candidate pairs of gradient edge points determined to correspond to the road marking edges, the autonomous vehicle 102 in a 3D LiDAR map of a geographic area in which the autonomous vehicle 102 is located. For example, autonomous vehicle 102 and/or map system 104 may compare the candidate pairs of gradient edge points determined to correspond to the road marking edges to road marking edges included in the 3D LiDAR map and localize autonomous vehicle 102 in the 3D LiDAR map based on Euclidean X, Y, and Z values of the edges having matching edges in the 3D LiDAR map relative to a common sensor frame of autonomous vehicle 102 used to capture the LiDAR dataset.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer implemented method comprising:
obtaining a LiDAR dataset generated by a LiDAR system, the LiDAR dataset defining a plurality of point clouds associated with a plurality of laser emitters of the LiDAR system;
separately processing, for each laser emitter of the plurality of laser emitters, a point cloud of the plurality of point clouds associated with that laser emitter by:
sorting, into a presorted array of points, points of the point cloud in an order according to azimuth angles associated with the points, times associated with the points, or any combination thereof, wherein neighboring points in the array correspond to neighboring measurements in a geographic area in which an autonomous vehicle is located;
determining, for each point in the point cloud, based on a gradient of intensity at that point for a pair of neighboring points in the point cloud including that point and another point, whether that point corresponds to a gradient edge point; and
determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge, wherein candidate pairs of edge points are selected by moving from a beginning of the presorted array of points and selecting a first positive gradient edge point identified in the array as a first candidate point of the pair of candidate points and moving from an end of the presorted array of points and selecting a first negative gradient edge point identified in the presorted array of points as a second candidate point of the pair of candidate points;

aggregating, from the processing of the plurality of point clouds, candidate pairs of gradient edge points determined to correspond to road marking edges; and using the candidate pairs of gradient edge points determined to correspond to the road marking edges to at least one of generate a map including the road marking edges, facilitate at least one autonomous driving operation of the autonomous vehicle, or any combination thereof.

2. The computer implemented method of claim 1, wherein determining, for each point in the point cloud, based on the gradient of intensity at that point, whether that point corresponds to a gradient edge point further includes:

determining, based on the gradient of intensity at that point for the pair of neighboring points in the point cloud including that point and the another point and a relative difference in intensity between the pair of neighboring points, whether that point corresponds to a gradient edge point.

3. The computer implemented method of claim 1, wherein determining whether the at least one candidate pair of gradient edge points corresponds to a road marking edge is based on at least one of the following parameters: an angular arc of the interior segment of points, a Euclidean distance of the interior segment of points, a maximum distance between consecutive points in the interior segment of points, a minimum intensity of the points in the interior segment of points, a ratio of the minimum intensity of the points in the interior segment of points to a maximum intensity of the points in the interior segment of points, a difference between a mean interior intensity of the interior segment of points and a mean exterior intensity of the exterior segments of points, a standard deviation of the interior segment of points, or any combination thereof.

4. The computer implemented method of claim 1, wherein point clouds of the plurality of point clouds associated with the plurality of laser emitters are processed in parallel using multithreading.

5. The computer implemented method of claim 1, wherein each LiDAR point cloud of the plurality of point clouds corresponds to a single 360 degree sweep of the LiDAR system.

6. The computer implemented method of claim 1, further comprising:

localizing, based on the candidate pairs of gradient edge points determined to correspond to the road marking edges, the autonomous vehicle in a 3D LiDAR map of the geographic area in which the autonomous vehicle is located.

7. A system comprising:
one or more processors programmed and/or configured to:
obtain a LiDAR dataset generated by a LiDAR system, the LiDAR dataset defining a plurality of point clouds associated with a plurality of laser emitters of the LiDAR system;

separately process, for each laser emitter of the plurality of laser emitters, a point cloud of the plurality of point clouds associated with that laser emitter by:
sorting, into a presorted array of points, points of the point cloud in an order according to azimuth angles associated with the points, times associated with the points, or any combination thereof, wherein neighboring points in the array correspond to neighboring measurements in a geographic area in which an autonomous vehicle is located;

determining, for each point in the point cloud, based on a gradient of intensity at that point for a pair of neighboring points in the point cloud including that point and another point, whether that point corresponds to a gradient edge point; and determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge, wherein candidate pairs of edge points are selected by moving from a beginning of the presorted array of points and selecting a first positive gradient edge point identified in the array as a first candidate point of the pair of candidate points and moving from an end of the presorted array of points and selecting a first negative gradient edge point identified in the presorted array of points as a second candidate point of the pair of candidate points;

aggregate, from the processing of the plurality of point clouds, candidate pairs of gradient edge points determined to correspond to road marking edges; and use the candidate pairs of gradient edge points determined to correspond to the road marking edges to at least one of generate a map including the road marking edges, facilitate at least one autonomous driving operation of the autonomous vehicle, or any combination thereof.

8. The system of claim 7, wherein determining, for each point in the point cloud, based on the gradient of intensity at that point, whether that point corresponds to a gradient edge point further includes:

determining, based on the gradient of intensity at that point for the pair of neighboring points in the point cloud including that point and the another point and a relative difference in intensity between the pair of neighboring points, whether that point corresponds to a gradient edge point.

9. The system of claim 7, wherein determining whether the at least one candidate pair of gradient edge points corresponds to a road marking edge is based on at least one of the following parameters: an angular arc of the interior segment of points, a Euclidean distance of the interior segment of points, a maximum distance between consecutive points in the interior segment of points, a minimum intensity of the points in the interior segment of points, a ratio of the minimum intensity of the points in the interior segment of points to a maximum intensity of the points in the interior segment of points, a difference between a mean interior intensity of the interior segment of points and a mean exterior intensity of the exterior segments of points, a standard deviation of the interior segment of points, or any combination thereof.

10. The system of claim 7, wherein the one or more processors are further programmed and/or configured to process point clouds of the plurality of point clouds associated with the plurality of laser emitters in parallel using multithreading.

11. The system of claim 7, wherein each LiDAR point cloud of the plurality of point clouds corresponds to a single 360 degree sweep of the LiDAR system.

12. The system of claim 7, wherein the one or more processors are further programmed and/or configured to:
localize, based on the candidate pairs of gradient edge points determined to correspond to the road marking edges, the autonomous vehicle in a 3D LiDAR map of the geographic area in which the autonomous vehicle is located.

13. An autonomous vehicle comprising:
a LiDAR system configured to generate a LiDAR dataset, the LiDAR dataset defining a plurality of point clouds associated with a plurality of laser emitters of the LiDAR system; and
a computing device programmed and/or configured to:
obtain a LiDAR dataset generated by a LiDAR system, the LiDAR dataset defining a plurality of point clouds associated with a plurality of laser emitters of the LiDAR system;
separately process, for each laser emitter of the plurality of laser emitters, a point cloud of the plurality of point clouds associated with that laser emitter by:
sorting, into a presorted array of points, points of the point cloud in an order according to azimuth angles associated with the points, times associated with the points, or any combination thereof, wherein neighboring points in the array correspond to neighboring measurements in a geographic area in which the autonomous vehicle is located;
determining, for each point in the point cloud, based on a gradient of intensity at that point for a pair of neighboring points in the point cloud including that point and another point, whether that point corresponds to a gradient edge point; and
determining, based on intensities of points in an interior segment of points between at least one candidate pair of gradient edge points and intensities of points in exterior segments of points outside the at least one candidate pair of gradient edge points, whether the at least one candidate pair of gradient edge points corresponds to a road marking edge, wherein candidate pairs of edge points are selected by moving from a beginning of the presorted array of points and selecting a first positive gradient edge point identified in the array as a first candidate point of the pair of candidate points and moving from an end of the presorted array of points and selecting a first negative gradient edge point identified in the presorted array of points as a second candidate point of the pair of candidate points;
aggregate, from the processing of the plurality of point clouds, candidate pairs of gradient edge points determined to correspond to road marking edges; and
localize, based on the candidate pairs of gradient edge points determined to correspond to the road marking edges, the autonomous vehicle in a 3D LiDAR map of the geographic area in which the autonomous vehicle is located.

14. The autonomous vehicle of claim 13, wherein determining, for each point in the point cloud, based on the gradient of intensity at that point, whether that point corresponds to a gradient edge point further includes:
determining, based on the gradient of intensity at that point for the pair of neighboring points in the point cloud including that point and the another point and a relative difference in intensity between the pair of neighboring points, whether that point corresponds to a gradient edge point.

15. The autonomous vehicle of claim 13, wherein determining whether the at least one candidate pair of gradient edge points corresponds to a road marking edge is based on at least one of the following parameters: an angular arc of the interior segment of points, a Euclidean distance of the interior segment of points, a maximum distance between consecutive points in the interior segment of points, a minimum intensity of the points in the interior segment of points, a ratio of the minimum intensity of the points in the interior segment of points to a maximum intensity of the points in the interior segment of points, a difference between a mean interior intensity of the interior segment of points and a mean exterior intensity of the exterior segments of points, a standard deviation of the interior segment of points, or any combination thereof.

16. The autonomous vehicle of claim 13, wherein the computing device is further programmed and/or configured to process point clouds of the plurality of point clouds associated with the plurality of laser emitters in parallel using multithreading.

17. The autonomous vehicle of claim 13, wherein each LiDAR point cloud of the plurality of point clouds corresponds to a single 360 degree sweep of the LiDAR system.

* * * * *